United States Patent [19]
Zaldivar et al.

[11] Patent Number: 5,288,438
[45] Date of Patent: Feb. 22, 1994

[54] CARBORANE CATALYZED GRAPHITIZATION OF POLYARYLACETYLENE (PAA)

[75] Inventors: Rafael J. Zaldivar, Tarzana; Ross W. Kobayashi, Long Beach, both of Calif.

[73] Assignee: The Aerospace Corporation, El Segundo, Calif.

[21] Appl. No.: 796,504

[22] Filed: Nov. 22, 1991

[51] Int. Cl.$^5$ .............................. C01B 31/00
[52] U.S. Cl. ................ 264/29.6; 423/445 R; 423/448; 423/460; 423/449.6
[58] Field of Search ............... 423/445, 448, 449, 460, 423/449.6; 264/29.1, 29.3, 29.5, 29.6

[56] References Cited

U.S. PATENT DOCUMENTS 3,859,043 1/1975 Duffy .................. 264/DIG. 19
5,024,710 6/1991 Sheaffer et al. ............ 264/29.5
5,093,156 3/1992 Uemura et al. ............ 427/249

OTHER PUBLICATIONS

Zaldimar et al., "Carborane Catalyzed Graphitization in Polyarylacetylene Derived Carbon Carbon Composites", *Carbon*, vol. 29, No. 8, 1145–1153, 1991.

*Primary Examiner*—Donald P. Walsh
*Assistant Examiner*—Ngoclan T. Mai
*Attorney, Agent, or Firm*—William J. Burke

[57] ABSTRACT

Carborane is used to catalyze the graphitization of polyarylacetylene (PAA) in order to form a uniform matrix microstructure both in bulk and as a composite matrix.

1 Claim, No Drawings

CARBORANE CATALYZED GRAPHITIZATION OF POLYARYLACETYLENE (PAA)

STATEMENT OF GOVERNMENT INTEREST

The invention described herein may be manufactured and used by or for the Government of the United States for governmental purposes without the payment of royalty therefor.

BACKGROUND OF THE INVENTION

1. Field of the Invention

This invention relates generally to matrix precursors for carbon-carbon composites and specifically to polyarylacetylene (PAA) resins.

2. Description of the Prior Art

Polyarylacetylene (PAA) resin is a superior material as a matrix precursor for carbon/carbon composites. It has a much higher char yield (approximately 95% theoretical and 88% observed char yield) than those attainable in conventional precursors such as phenolic and pitch. The high char-yield of PAA produces carbon-/carbon composites with reduced shrinkage and weight loss, and therefore requires fewer reimpregnation cycles to achieve a desired density.

One drawback of PAA as a carbon precursor is the inability to control the crystallinity of the carbon matrix due to its highly cross-linked nature. In order for the cross-linked polymer to rearrange and form a highly graphitic structure, a large number of carbon-to-carbon bonds must be broken and subsequently rearranged. This energy barrier cannot be overcome even upon heat treatments in excess of 2800 degrees Centigrade. As a result, PAA like other thermoset resins, always chars in place to form a poorly ordered glassy or vitreous carbon. Within a composite, PAA displays graphitization localized around the fiber. Although this localized graphitization occurs with heat-treatment to 2400 degrees Centigrade, areas exist in which the matrix remains glassy.

Metals are well known catalysts for graphitization. Nickel is a catalyst for graphitization of PAA, pitch, and phenolic resins but is detrimental to graphite fibers. Boron has also been shown to be an effective graphitizing catalyst for various cokes and glassy-type carbonaceous material. Most catalyst studies were done on thermoplastic carbons for the purpose of understanding the mechanism for catalytic graphitization. According to the prior art, an integration of the catalyst into the polymers was done in an inhomogeneous manner. A powder with a particle size of approximately 1-100 microns is mechanically mixed with the viscous polymer. Segregation of the powder, along with the settling of this second phase, was usually evident.

Therefore, the principal objective of this invention is to improve the use of PAA as a carbon-carbon matrix precursor through control of the PAA microstructure.

SUMMARY OF THE INVENTION

This invention discloses a new process by which the microstructure of PAA is controlled. Uniform graphitic microstructures are obtained by the use of carborane as a catalyst.

DETAILED DESCRIPTION OF THE PREFERRED EMBODIMENT

This invention discloses a new process by which PAA is catalytically graphitized. Through this process, PAA becomes a better carbon-carbon matrix precursor because the microstructure can be controlled from a glassy carbon to a graphitic structure.

There are many advantages in obtaining graphitic structures. Graphitic structures have a higher strain-to-failure than glassy carbons and therefore behave as tougher matrices. Graphitic carbons have a slower ablation recession rate than glassy carbons due to their high density which makes graphitic carbons desirable for rocket exit cone materials. Also, the more graphitic the matrix structure, the greater the thermal and electrical conductivities.

A controlled structure of the carbonized PAA is achieved by the addition of a graphitizing catalyst. In addition to graphitizing the matrix, we have determined that the catalyst must (1) not significantly lower the desirable high char yield of PAA, (2) not be detrimental to the fibers, (3) be uniformly distributed, (4) not segregate from or agglomerate in the PAA, and (5) not cause voids in the matrix during graphitization.

With these constraints, a carborane, ($C_2B_{10}H_{12}$) was chosen as the graphitizing catalyst. The carborane is desirable for the graphitization but does not significantly lower the char yield. Unlike nickel catalysts, carboranes are not detrimental to the fibers. The carborane is also soluble in the PAA impregnating solution and therefore is distributed better than other catalysts. This solubility also enables the formation of a homogeneous carborane-doped matrix precursor for carbon-carbon composites. Previous catalysts for graphitization were inhomogeneously distributed and therefore useless in carbon-carbon composite fabrication. Lastly, the carborane does not cause voids in the matrix during heat-treatments such as those created in metal catalyzed systems.

In a preferred embodiment, the PAA was prepared by the cyclotrimerization of diethynylbenzene isomers. The resin system used for this study was PAA with an approximate 60/40 ratio of meta to para diethynylbenzene isomers. The monomers were catalytically cyclotrimerized using nickel (II) 2,4-pentanedionate in methyl ethyl ketone (MEK). The prepolymer solution was vacuum dried to remove the MEK solvent, leaving a brown solid. The solid was then ground by mortar and pestle to obtain the dried prepolymer powder.

The carborane ($C_2B_{10}H_{12}$) was added to MEK and then the mixture was azeotropically distilled. The solution was allowed to cool to room temperature under inert atmosphere, and the PAA prepolymer powder was added to the stirred solution. This technique insured the homogeneity of the carborane-doped system. The solubility of the carborane/PAA in this final solution was crucial in composite fabrication. This solution was used to impregnate fibers for composite fabrication. The fibers were then placed in a mold and cured (175 degrees Centigrade) and post cured (250 degrees Centigrade) under ~300 psi. The resulting composites were heat-treated under inert atmosphere to 1100 degrees Centigrade, 1800 degrees Centigrade, and 2400 degrees Centigrade. In addition to the composites, discs of the carborane-doped PAA were cured, post cured, and heat-treated to examine the effect of the catalyst by X-ray diffraction.

The X-ray diffraction profile of neat PAA heat treated to 1200 degrees Centigrade shows two broad peaks at $2\theta=25$ degrees and $2\theta=44$ degrees, which correspond to the (002) and (004) X-ray diffraction peaks, respectively. The (002) peak should be located at $2\theta > 26.5$ degrees to indicate a graphitic structure. Any $2\theta$ value less than 26.5 degrees produces a d-spacing greater than 3.36 angstroms; graphite has a d-spacing of 3.354 angstroms and glassy carbons typically have d-spacings of 3.40 angstroms or greater. A (004) peak is the sign of three dimensional ordering or crystallite thickness. After a heat-treatment of 1800 degrees Centigrade, neither peak is well developed, indicating an amorphous structure. Even after heat-treatment temperatures as high as 2800 degrees Centigrade, PAA has a d-spacing of 3.45 Angstroms and a crystallite thickness of only 25 Angstroms. In comparison, the X-ray diffraction profile of a 5% carborane-doped ($C_2B_{10}H_{12}$) PAA, heat-treated to 1800 degrees Centigrade, reveals a diffraction peak corresponding to a d-spacing of 3.38 Angstroms. Higher heat-treatments to 2400 degrees Centigrade increased the crystallinity. The X-ray diffraction peak becomes sharp and well defined with a d-spacing of 3.358 Angstroms. This d-spacing approaches the value of graphite and the crystallite thickness is greater than 400 Angstroms.

The microstructure of the carbon-carbon composites was examined by scanning electron microscopy (SEM). The SEM revealed that the composites derived from the 5% carborane-doped PAA display a small amount of texture in the matrix after a heat-treatment of 1800 degrees Centigrade. This texture indicates a transformation, possibly the onset of graphitization. The undoped PAA, heat-treated to 1800 degrees Centigrade, appears not to have any crystallinity whatsoever. With further heat-treatment to 2400 degrees Centigrade, the carborane-doped PAA matrix appears highly graphitic through examination by SEM. Distinct lamellae structure appears to have formed in the carborane catalyzed system after heat-treatment to 2400 degrees Centigrade, while, after the same heat-treatment, the undoped system still contains large areas of glassy carbon.

Ion microprobe mass analysis (IMMA) was utilized to identify the location of the boron within the carborane-doped PAA composites. The IMMA revealed that the boron was well distributed throughout the matrix with virtually no agglomeration for composites heat-treated below 1100 degrees Centigrade. For high concentrations of carborane ($\geq 3\%$) and high heat-treatments ($\geq 2400$ degrees Centigrade), some migration of boron from the matrix into the polyacrylonitrile (PAN) based carbon fibers was observed by IMMA although fiber degradation was not seen by SEM. No migration of boron was detected in low concentrations ($\leq 1\%$) of carborane in PAA/PAN-based carbon fiber or in any of the pitch-based carbon fiber composites.

The novel feature of this invention is that the carborane catalyzes the graphitization of PAA to form a uniform matrix microstructure both in bulk and as a composite matrix. During graphitization, voids are not formed in the matrix nor is the char yield significantly lowered. The use of the carborane-doped PAA is a simple, yet efficient method of obtaining a controlled graphitic carbon matrix. In addition, lower final heat-treatment temperatures are possible which avoid deleterious thermal effects to the fibers. These qualities enhance the attractiveness of PAA as a carbon-carbon matrix precursor.

We claim:

1. A process for producing a carbon-carbon composite comprising a carbon matrix reinforced by carbon fibers, the method comprises the steps of:
    a. preparing the matrix from a blend of polyarylacetylene (PAA) and carborane ($C_2B_{10}H_{12}$) in a concentration of 1 to 5 boron weight percent solution in a solvent;
    b. orienting the carbon fibers within the blend to provide a precursor for the carbon-carbon composite; and
    c. curing and heat treating the precursor in a non-reactive atmosphere up to 2500 degrees Centigrade to produce the carbon-carbon composite.

* * * * *